United States Patent
Cho et al.

(10) Patent No.: US 7,489,434 B2
(45) Date of Patent: Feb. 10, 2009

(54) HYBRID MICROMIRROR ARRAY LENS FOR REDUCING CHROMATIC ABERRATION

(75) Inventors: Gyoung Il Cho, Seoul (KR); Jin Young Sohn, Fullerton, CA (US); Sang Hyune Baek, Suwon (KR); Cheong Soo Seo, Seongnam (KR)

(73) Assignees: Angstrom, Inc., Seongnam (KR); Stereo Display, Inc., Anaheim, CA (US)

( * ) Notice: Subject to any disclaimer, the term of this patent is extended or adjusted under 35 U.S.C. 154(b) by 121 days.

(21) Appl. No.: 11/743,664

(22) Filed: May 2, 2007

(65) Prior Publication Data

US 2008/0273235 A1    Nov. 6, 2008

(51) Int. Cl.
  G02B 26/00  (2006.01)
  G02B 26/08  (2006.01)
  G02B 7/182  (2006.01)
(52) U.S. Cl. .................. 359/290; 359/225; 359/851; 359/854
(58) Field of Classification Search .......... 359/198, 359/224, 225, 230, 290, 291, 298, 846, 850, 359/851, 853, 854, 872
  See application file for complete search history.

(56) References Cited

U.S. PATENT DOCUMENTS

| | | | |
|---|---|---|---|
| 2,002,376 A | 5/1935 | Mannheimer |
| 4,407,567 A | 10/1983 | Michelet |
| 4,834,512 A | 5/1989 | Austin |
| 4,853,787 A | 8/1989 | Kurth |
| 4,944,580 A | 7/1990 | MacDonald |
| 5,004,319 A | 4/1991 | Smither |
| 5,172,235 A | 12/1992 | Wilm |
| 5,212,555 A | 5/1993 | Stoltz |
| 5,369,433 A | 11/1994 | Baldwin |
| 5,402,407 A | 3/1995 | Eguchi |
| 5,467,121 A | 11/1995 | Allcock |
| 5,612,736 A | 3/1997 | Vogeley |
| 5,661,518 A | 8/1997 | Palm |
| 5,696,619 A | 12/1997 | Knipe |
| 5,748,199 A | 5/1998 | Palm |
| 5,881,034 A | 3/1999 | Mano |
| 5,897,195 A | 4/1999 | Choate |
| 5,986,811 A | 11/1999 | Wohlstadter |
| 6,025,951 A | 2/2000 | Swart |
| 6,028,689 A | 2/2000 | Michalicek |

(Continued)

FOREIGN PATENT DOCUMENTS

JP    08-043881    2/1996

(Continued)

*Primary Examiner*—William C Choi

(57) ABSTRACT

This invention provides a Hybrid Micromirror Array Lens with reduced chromatic aberration over a broadband wavelength range of light. Conventional micromirror array lens uses phase matching condition. Therefore, the optical surface profile of Micromirror Array Lens using the same phase condition has a discontinuous surface profile. As the required optical power of Micromirror Array Lens is increased, the number of profile discontinuity of Micromirror Array Lens is increased. Therefore, the chromatic aberration is increased. To minimize the chromatic aberration, the number of profile discontinuity should be minimized. The number of discontinuity is reduced when the optical surface profile has a simulating base curve, called a translation contour with optical power. Hybrid Micromirror Array Lens is invented to reduce a large translational amount and chromatic aberration for large optical power lens.

30 Claims, 6 Drawing Sheets

U.S. PATENT DOCUMENTS

| | | |
|---|---|---|
| 6,064,423 A | 5/2000 | Geng |
| 6,084,843 A | 7/2000 | Abe |
| 6,104,425 A | 8/2000 | Kanno |
| 6,111,900 A | 8/2000 | Suzudo |
| 6,123,985 A | 9/2000 | Robinson |
| 6,233,087 B1 | 5/2001 | Hawkins |
| 6,282,213 B1 | 8/2001 | Gutin |
| 6,304,263 B1 | 10/2001 | Chiabrera |
| 6,315,423 B1 | 11/2001 | Yu |
| 6,329,737 B1 | 12/2001 | Jerman |
| 6,329,963 B1 | 12/2001 | Chiabrera |
| 6,421,081 B1 | 7/2002 | Markus |
| 6,438,272 B1 | 8/2002 | Huang |
| 6,498,673 B1 | 12/2002 | Frigo |
| 6,507,366 B1 | 1/2003 | Lee |
| 6,549,730 B1 | 4/2003 | Hamada |
| 6,600,591 B2 | 7/2003 | Anderson |
| 6,611,343 B1 | 8/2003 | Frankowski |
| 6,618,209 B2 | 9/2003 | Nishioka |
| 6,625,342 B2 | 9/2003 | Staple |
| 6,649,852 B2 | 11/2003 | Chason |
| 6,650,461 B2 | 11/2003 | Atobe |
| 6,658,208 B2 | 12/2003 | Watanabe |
| 6,711,319 B2 | 3/2004 | Hoen |
| 6,741,384 B1 | 5/2004 | Martin |
| 6,781,731 B2 | 8/2004 | Choi |
| 6,781,732 B2 | 8/2004 | Cho |
| 6,784,771 B1 | 8/2004 | Fan |
| 6,801,260 B1 | 10/2004 | Veksland |
| 6,804,429 B2 | 10/2004 | Yu |
| 6,833,938 B2 | 12/2004 | Nishioka |
| 6,836,459 B2 | 12/2004 | Komoto |
| 6,870,660 B2 | 3/2005 | DiCarlo |
| 6,885,819 B2 | 4/2005 | Shinohara |
| 6,900,901 B2 | 5/2005 | Harada |
| 6,900,922 B2 | 5/2005 | Aubuchon |
| 6,906,848 B2 | 6/2005 | Aubuchon |
| 6,906,849 B1 | 6/2005 | Mi |
| 6,909,453 B2 | 6/2005 | Mochizuki |
| 6,914,712 B2 | 7/2005 | Kurosawa |
| 6,919,982 B2 | 7/2005 | Nimura |
| 6,934,072 B1 | 8/2005 | Kim |
| 6,934,073 B1 | 8/2005 | Kim |
| 6,943,950 B2 | 9/2005 | Lee |
| 6,944,103 B2 | 9/2005 | Hong |
| 6,956,687 B2 | 10/2005 | Moon |
| 6,958,777 B1 | 10/2005 | Pine |
| 6,970,284 B1 | 11/2005 | Kim |
| 6,971,116 B2 | 11/2005 | Takeda |
| 6,985,299 B2 | 1/2006 | Bakin |
| 6,995,897 B2 | 2/2006 | Mushika |
| 6,995,909 B1 | 2/2006 | Hayashi |
| 6,999,226 B2 | 2/2006 | Kim |
| 7,009,561 B2 | 3/2006 | Menache |
| 7,019,376 B2 | 3/2006 | Patel |
| 7,023,466 B2 | 4/2006 | Favalora |
| 7,025,461 B2 | 4/2006 | Veligdan |
| 7,027,207 B2 | 4/2006 | Huibers |
| 7,031,046 B2 | 4/2006 | Kim |
| 7,046,447 B2 | 5/2006 | Raber |
| 7,057,826 B2 | 6/2006 | Cho |
| 7,068,415 B2 | 6/2006 | Mushika |
| 7,068,416 B2 | 6/2006 | Gim |
| 7,077,523 B2 | 7/2006 | Seo |
| 7,079,325 B2 | 7/2006 | Konno |
| 7,088,493 B2 | 8/2006 | Alain |
| 7,091,057 B2 | 8/2006 | Gan |
| 7,127,136 B2 | 10/2006 | Hall |
| 7,161,729 B2 | 1/2007 | Kim |
| 7,164,465 B2 | 1/2007 | Klosner |
| 7,173,653 B2 | 2/2007 | Gim |
| 7,184,192 B2 | 2/2007 | Sandstrom |
| 7,195,163 B2 | 3/2007 | Yoo |
| 7,209,286 B2 | 4/2007 | Mann |
| 7,212,330 B2 | 5/2007 | Seo |
| 7,215,882 B2 | 5/2007 | Cho |
| 7,239,438 B2 | 7/2007 | Cho |
| 7,245,325 B2 | 7/2007 | Yamaguchi |
| 7,245,363 B2 | 7/2007 | Mushika |
| 7,261,417 B2 | 8/2007 | Cho |
| 7,267,447 B2 | 9/2007 | Kim |
| 7,274,517 B2 | 9/2007 | Cho |
| 7,306,344 B2 | 12/2007 | Abu-Ageel |
| 7,315,503 B2 | 1/2008 | Cho |
| 7,333,260 B2 | 2/2008 | Cho |
| 7,339,746 B2 | 3/2008 | Kim |
| 7,354,167 B2 | 4/2008 | Cho |
| 7,355,627 B2 | 4/2008 | Yamazaki |
| 7,370,412 B2 | 5/2008 | Hiraoka |
| 2003/0174234 A1 | 9/2003 | Kondo |
| 2004/0021802 A1 | 2/2004 | Yoshino |
| 2004/0184146 A1 | 9/2004 | Uehara |
| 2004/0207768 A1 | 10/2004 | Liu |
| 2005/0206773 A1 | 9/2005 | Kim |
| 2005/0207486 A1 | 9/2005 | Lee |
| 2005/0212856 A1 | 9/2005 | Temple |
| 2005/0259158 A1 | 11/2005 | Jacob |
| 2006/0007301 A1 | 1/2006 | Cho |
| 2006/0120706 A1 | 6/2006 | Cho |
| 2006/0146140 A1 | 7/2006 | Kennedy |
| 2006/0209439 A1 | 9/2006 | Cho |
| 2006/0256332 A1 | 11/2006 | Sandstrom |
| 2007/0263113 A1 | 11/2007 | Baek |

FOREIGN PATENT DOCUMENTS

| | | |
|---|---|---|
| JP | 11-069209 | 3/1999 |
| JP | 2002-288873 | 10/2002 |

HYBRID MICROMIRROR ARRAY LENS FOR REDUCING CHROMATIC ABERRATION

BACKGROUND OF THE INVENTION

The present invention relates to a Micromirror Array Lens device. Particularly, the present invention related to Micromirror Array Lens device reducing chromatic aberration for a light with broadband wavelength range.

There are two conditions to make a perfect lens. The first is the converging condition that all light rays scattered by one point of an object should converge into one point of an image plane. The second is the same phase condition that all converging light rays should have the same phase at the image plane. The surface shape of conventional reflective lens is formed to satisfy these perfect lens conditions by having all light rays scattered by one point of an object converged into one point of the image plane and the optical path length of all converging light rays to be the same.

The Micromirror Array Lens can simulate the perfect lens conditions by rotating micromirrors to make all light rays scattered by one point of an object converged into one point of an image plane and translating each micromirror to make all converging light rays to have the same phase. Even though the optical path length of converging light rays in the micromirror array is different from that of the equivalent conventional reflective lens, the same phase condition can be satisfied by adjusting the translational motion of each micromirror because the phase of light is periodic. The surface profile of Micromirror Array Lens using the same phase condition has a discontinuous surface profile.

The general principle and methods for making the Micromirror Array Lens are disclosed in U.S. Pat. No. 6,970,284 issued Nov. 29, 2005 to Kim, U.S. Pat. No. 7,031,046 issued Apr. 18, 2006 to Kim, U.S. Pat. No. 6,934,072 issued Aug. 23, 2005 to Kim, U.S. Pat. No. 6,934,073 issued Aug. 23, 2005 to Kim, U.S. Pat. No. 7,161,729 issued Jan. 09, 2007, U.S. Pat. No. 6,999,226 issued Feb. 14, 2006 to Kim, U.S. Pat. No. 7,095,548 issued Aug. 22, 2006 to Cho, U.S. patent application Ser. No. 10/893,039 filed Jul. 16, 2004, U.S. patent application Ser. No. 10/983,353 filed Nov. 8, 2004, U.S. patent application Ser. No. 11/076,616 filed Mar. 10, 2005 and U.S. patent application Ser. No. 11/426,565 filed Jun. 26, 2006, all of which are incorporated herein by references.

The phase matching condition is only satisfied for monochromatic light. In general, light has a broadband wavelength range. In this case, when the phase matching condition is satisfied for one wavelength by the translational motion of the micromirror, the phase matching condition for other wavelengths can not be satisfied. The chromatic aberration is increased as the number of profile discontinuity of Micromirror Array Lens is increased. If micromirror array makes continuous reflective lens profile, there is no chromatic aberration. But, it is impractical because micromirrors should have huge translation to make continuous reflective lens profile.

When the Micromirror Array Lens is required to have small optical power, chromatic aberration caused by the profile discontinuity is small. However, when the Micromirror Array Lens is required to have large optical power, the number of profile discontinuity is increased. In this case, the chromatic aberration is increased.

To reduce profile discontinuity and chromatic aberration, Hybrid Micromirror Array Lens is introduced in this application.

SUMMARY OF THE INVENTION

The present invention contrives to reduce chromatic aberration for light with a broadband wavelength range in Micromirror Array Lens.

Micromirrors are in the Micromirror Array Lens arranged on a flat plane. The micromirrors make all the light rays converged which are scattered by one point of an object into one point of an image plane by rotational motion of micromirrors, wherein micromirrors can rotate about one or two axes on the micromirror surface. Each converging light ray has different Optical Path Length (OPL). For monochromatic light, the same phase condition can be satisfied by adjusting the phase of light because a phase of light is periodic. The rotational and/or translational motions of micromirrors can be controlled to adjust the phase of light. To satisfy the same phase condition, the required translational displacement of micromirrors is at least half of the wavelength of light.

The same phase condition is satisfied for monochromatic light. In general, light has a broadband wavelength range. In this case, when the same phase condition is satisfied for one wavelength by the translational motion of the micromirror, the same phase condition for other wavelengths can not be satisfied. The chromatic aberration is increased as the number of profile discontinuity of the Micromirror Array Lens is increased. If the Micromirror Array Lens simulates continuous reflective lens profile, there is no chromatic aberration. But, it is impractical because the Micromirror Array Lens should have huge translation to make continuous reflective lens profile.

When the Micromirror Array Lens is required to have small optical power, chromatic aberration caused by the profile discontinuity is small. However, when the Micromirror Array Lens is required to have large optical power, the number of profile discontinuity is increased. Therefore, the chromatic aberration is increased.

The large optical power can be generated by Hybrid Micromirror Array Lens, which uses a combination of a power of continuous reflective lens and a power of conventional Micromirror Array Lens.

At the conventional Micromirror Array Lens, the base curve is flat so that there is no power on base curve and the required translational amount is less than a wavelength. Only half a wavelength is the sufficient amount for the periodic phase matching condition. If optical path length (OPL) difference between two converging rays reflected two neighbor micromirrors is larger than one wavelength, the optical surface profile of the Micromirror Array Lens will be discontinuous by a periodic phase matching condition. At the discontinuous optical surface profiles, chromatic aberration occurs.

To reduce the chromatic aberration, the number of profile discontinuity should be minimized. If the Micromirror Array Lens is arranged on a curved surface with some power, the number of discontinuity is decreased because the curved surface has a power itself.

In practical, it is very hard to make a micromirror array on curve substrate for the microfabrication technology. By using a large amount of translation, the base curve can be simulated instead of having curved substrate. While simulating the base curved surface, a huge amount of translational is required.

Hybrid Micromirror Array Lens is invented to reduce a large translational amount and chromatic aberration for large optical power lens. Total optical power of the Micromirror Array lens can be achieved by a power made by a base curve, which is simulated by a contour of micromirror translation and a power of rotational motion of the micromirrors, which is described in the conventional Micromirror Array Lens.

The Hybrid Micromirror Array Lens of the present invention comprises a plurality of micromirrors. Rotation and translation of each micromirror in the Hybrid Micromirror Array Lens are controlled to have at least one optical surface profile. The rotation of the micromirror is controlled to satisfy converging condition and the translation of the micromirror is controlled in order to have a translation contour with optical power and to satisfy periodic phase matching condition.

Each optical surface profile in the Hybrid Micromirror Array Lens simulates a lens with predetermined optical properties. Thanks to the periodic phase matching condition, the micromirrors in the Hybrid Micromirror Array Lens can be arranged in a flat surface. Motion of each micromirror is defined as a combination of rotation and translation. The optical surface profile is determined by rotation and translation of the micromirrors in the Hybrid Micromirror Array Lens.

The optical surface profile has a translation contour purely determined by translation of the micromirrors. To meet the periodic phase matching condition, half wavelength of the wavelength is the minimum amount of the translation. But the translation motion can be used for building a translation contour. The optical surface profile has a translation contour purely determined by translation of the micromirrors. The translation contour extends the total optical power of the Micromirror Array Lens. Total optical power of the Micromirror Array lens can be achieved by a power made by a base curve, which is simulated by a contour of micromirror translation and a power of rotational motion of the micromirrors, which is described in the conventional Micromirror Array Lens.

The general principle and methods for making the Micromirror Array Lens are disclosed in U.S. Pat. No. 6,970,284 issued Nov. 29, 2005 to Kim, U.S. Pat. No. 7,031,046 issued Apr. 18, 2006 to Kim, U.S. Pat. No. 6,934,072 issued Aug. 23, 2005 to Kim, U.S. Pat. No. 6,934,073 issued Aug. 23, 2005 to Kim, U.S. Pat. No. 7,161,729 issued Jan. 09, 2007, U.S. Pat. No. 6,999,226 issued Feb. 14, 2006 to Kim, U.S. Pat. No. 7,095,548 issued Aug. 22, 2006 to Cho, U.S. patent application Ser. No. 10/893,039 filed Jul. 16, 2004, U.S. patent application Ser. No. 10/983,353 filed Nov. 8, 2004, U.S. patent application Ser. No. 11/076,616 filed Mar. 10, 2005 and U.S. patent application Ser. No. 11/426,565 filed Jun. 26, 2006, all of which are incorporated herein by references.

And the general properties of the Micromirror Array Lens are disclosed in U.S. Pat. No. 7,057,826 issued Jun. 6, 2006 to Cho, U.S. Pat. No. 7,173,653 issued Feb. 06, 2007, U.S. patent application Ser. No. 10/896,146 filed Jul. 21, 2004, U.S. patent application Ser. No. 10/979,568 filed Nov. 2, 2004, U.S. patent application Ser. No. 11/218,814 filed Sep. 2, 2005, U.S. patent application Ser. No. 11/359,121 filed Feb. 21, 2006, U.S. patent application Ser. No. 11/382,273 filed May 9, 2006, U.S. patent application Ser. No. 11/429,034 filed May 5, 2006 and U.S. patent application Ser. No. 11/743,656 filed May 2, 2007, all of which are incorporated herein by references.

The optical property of Hybrid Micromirror Array Lens which is described by the individual optical surface profile are focal length of the Hybrid Micromirror Array lens, optical axis of the Hybrid Micromirror Array Lens, field of view of the Hybrid Micromirror Array Lens, aberration correction of the Hybrid Micromirror Array Lens, optical power of the Hybrid Micromirror Array Lens, optical magnification of the Hybrid Micromirror Array Lens, and others.

To build a Micromirror Array lens, optical surface profile of the Hybrid Micromirror Array Lens satisfies the periodic phase matching condition. The optical surface profile satisfies the periodic phase matching condition for one wavelength. The optical surface profile satisfies the periodic phase matching condition for effective wavelength.

By proper structural arrangement for micromirrors, the Hybrid Micromirror Array Lens can have multiple optical surface profiles. And the optical surface profile is changed. This changeable optical surface profile can provide variable optical properties to the Micromirror Array Lens.

The Hybrid Micromirror Array Lens changes its focal length by changing the optical surface profiles. The Hybrid Micromirror Array Lens changes its optical axis by changing the optical surface profiles. The Hybrid Micromirror Array Lens changes its field of view by changing the optical surface profiles. The Hybrid Micromirror Array Lens changes its property for aberration correction by changing the optical surface profiles.

The Hybrid Micromirror Array Lens changes its optical power by changing the optical surface profiles. The optical power is changed by change of the translational contour. The translation contour extends the total optical power of the Micromirror Array Lens. Total optical power of the Micromirror Array lens can be achieved by a power made by a base curve, which is simulated by a contour of micromirror translation and a power of rotational motion of the micromirrors. By introducing the translation contour, the Micromirror Array Lens can extend its optical power. Also the Hybrid Micromirror Array Lens changes its optical magnification by changing the optical surface profiles.

The optical surface profiles satisfy the periodic phase matching condition for one wavelength. Or the optical surface profile satisfies the periodic phase matching condition for effective wavelength. The effective wavelength can be defined as a design variable for making optical system. The effective wavelength is one representative wavelength which can best describe the optical system including the periodic phase matching condition.

Each optical surface profile satisfies the periodic phase matching condition for corresponding wavelength. Each optical surface profile can have different value for periodic phase matching wavelength. The corresponding wavelength is one of Red, Green, and Blue. Also the corresponding wavelength is one of Yellow, Cyan, and Magenta.

By using the least common multiple wavelength of the light, the optical system can be optimized. The Hybrid Micromirror Array Lens can have a least common multiple of Red, Green, and Blue as the corresponding wavelength.

By using the least common multiple wavelength of the light, the optical system can be optimized. The Hybrid Micromirror Array Lens can have a least common multiple of Yellow, Cyan, and Magenta as the corresponding wavelength.

Furthermore, the optical surface profile is discretely controlled. By introducing a discretely controlled micromirrors, the Hybrid Micromirror Array lens can be easily controlled and have simpler control method. Each optical surface profile is formed by a common input signal to micromirrors in the Hybrid Micromirror Array Lens.

The detailed structures of the discretely controlled micromirrors and discretely controlled Micromirror Array Lens can be found in U.S. patent application Ser. No. 10/872,241 filed Jun. 18, 2004, U.S. patent application Ser. No. 11/072,597 filed Mar. 4, 2005, U.S. patent application Ser. No. 11/347,590 filed Feb. 4, 2006, U.S. patent application Ser. No.

11/369,797 filed Mar. 6, 2006, U.S. patent application Ser. No. 11/463,875 filed Aug. 10, 2006, U.S. patent application Ser. No. 11/534,613 filed Sep. 22, 2006, U.S. patent application Ser. No. 11/534,620 filed Sep. 22, 2006, U.S. patent application Ser. No. 11/549,954 filed Oct. 16, 2006, U.S. patent application Ser. No. 11/609,882 filed Dec. 12, 2006, U.S. patent application Ser. No. 11/685,119 filed Mar. 12, 2007 and U.S. patent application Ser. No. 11/693,698 filed Mar. 29, 2007, all of which are incorporated herein by references.

Although the present invention is briefly summarized, the full understanding of the invention can be obtained by the following drawings, detailed descriptions, and appended claims.

DESCRIPTION OF FIGURES

These and other features, aspects and advantages of the present invention will become better understood with reference to the accompanying drawings, wherein.

Figure 6:
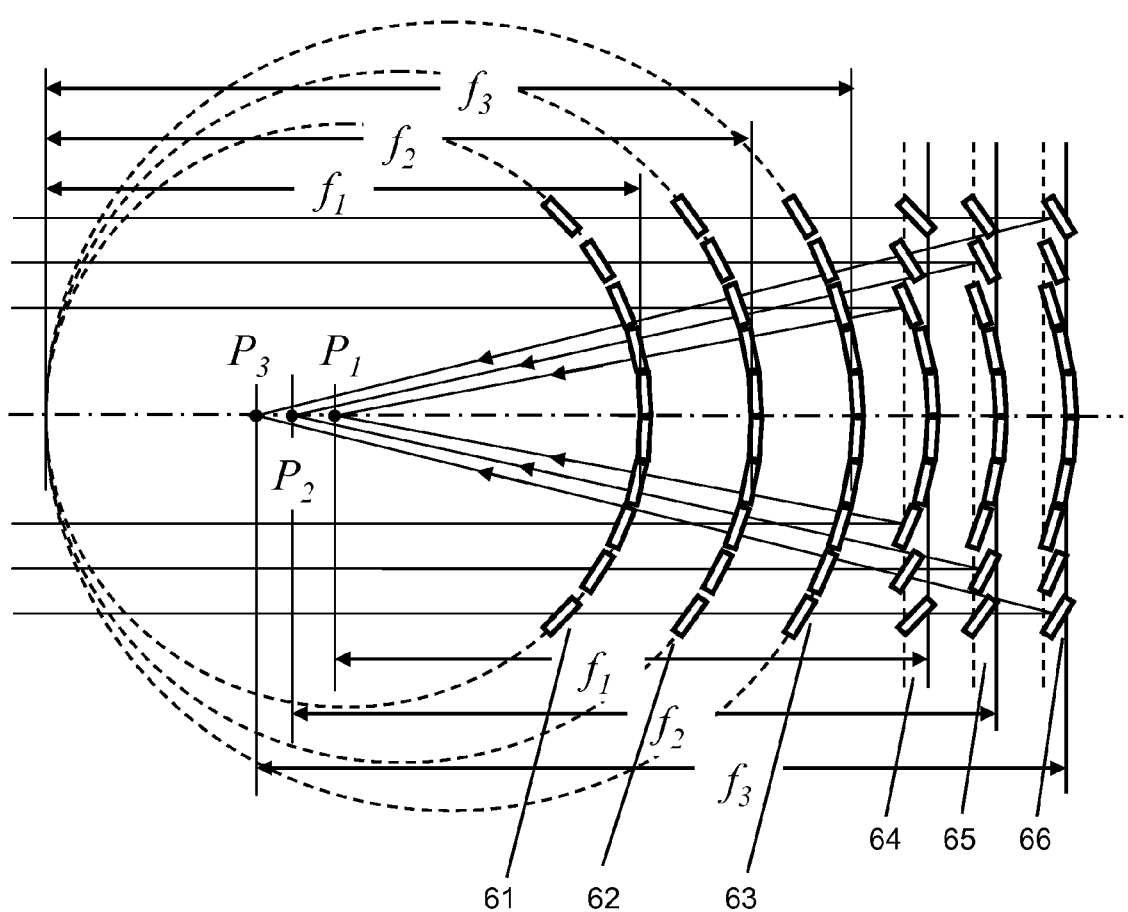

The FIG. 6 shows the variable focusing property of the Hybrid Micromirror Array Lens;

The FIG. 7 shows how the optical axis of the Hybrid Micromirror Array Lens changes.

DETAILED DESCRIPTION OF THE ILLUSTRATED EMBODIMENTS

Figure 1:
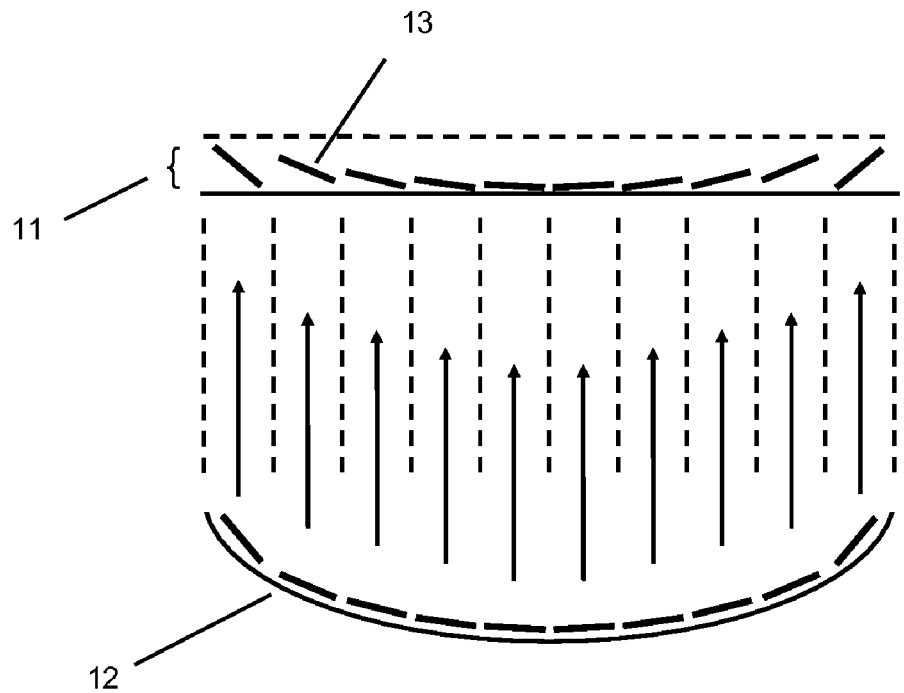
FIG. 1 illustrates the relation between a Micromirror Array Lens and conventional reflective lens.

FIG. 1 illustrates the relation between a Micromirror Array Lens 11 and conventional reflective lens 12. There are two conditions to make a perfect lens. The first is the converging condition that all light rays scattered by one point of an object should converge into one point of an image plane. The second is the same phase condition that all converging light rays should have the same phase at the image plane. To satisfy the perfect lens conditions, the surface shape of a conventional reflective lens 12 is formed to have all light rays scattered by one point of an objective to be converged into one point of the image plane and have the Optical Path Length (OPL) of all converging light rays to be the same.

Micromirror array 11 on flat surface can be a lens like the conventional reflective lens 12 using a periodic property of a light. Lights can be converged by rotation of micromirrors 13. But, the converging light should have different OPL because the micromirror array is located on flat surface. Because the phase of light has a periodic property, the phase of converging rays can be adjusted by translation amount of only one wavelength even though converging rays have different OPL.

Figure 2:
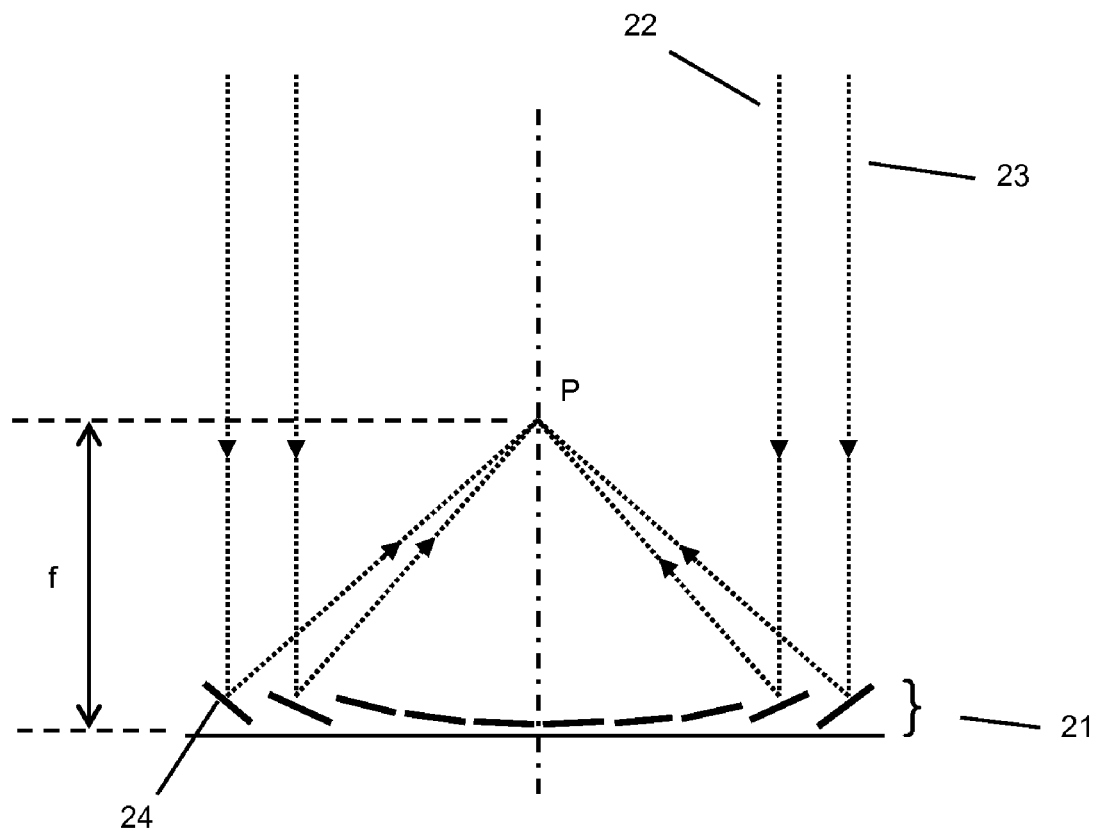
FIG. 2 illustrates how a conventional Micromirror Array Lens makes an image.
Figure 3:
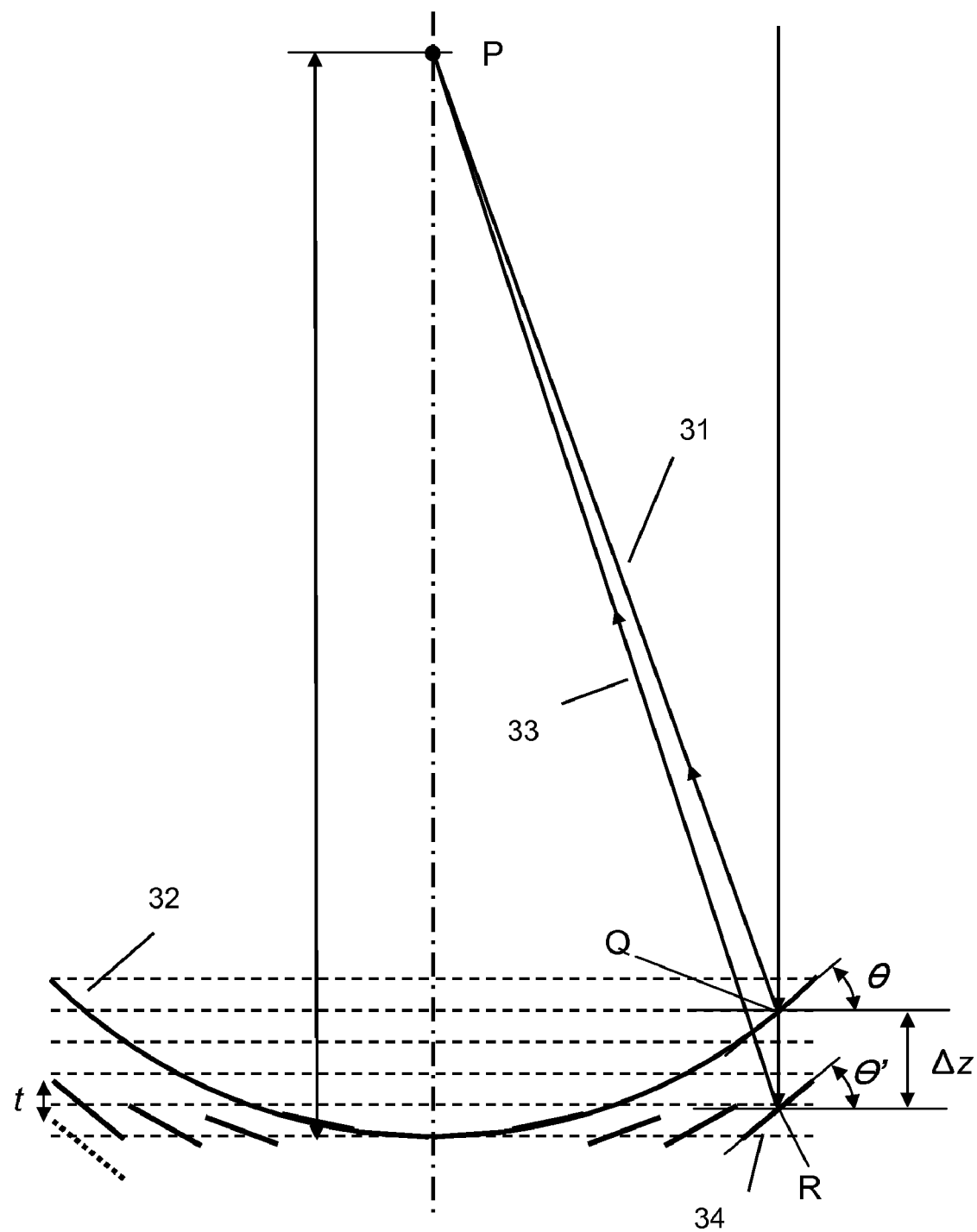
FIG. 3 shows the optical path length difference between a ray reflected by a single bodied reflective surface and a ray reflected by a micromirror.

FIG. 2 illustrates how a Micromirror Array Lens 21 makes an image. Arbitrary scattered light rays 22 and 23 are converged into one point P of an image plane by controlling the motions of micromirrors 24. The phases of arbitrary light rays 22 and 23 can be adjusted to be the same by translating micromirrors 24. The required translational motion is at least half of the wavelength of light. The focal length f of the Micromirror Array Lens 21 is changed by controlling the rotation and the translation of each micromirror 24. However, the same phase condition can be satisfied only for monochromatic light. In general, light has a broadband wavelength range and the OPL of light rays converged by rotation of micromirrors 24 is different as shown in FIG. 3. The aberration is ignorable when the Micromirror Array Lens 21 is required to have small optical power. But the Micromirror Array Lens 21 has large chromatic aberration when it is required to have large optical power.

FIG. 3 shows the Optical Path length difference (OPD) between a ray 31 reflected by a single bodied reflective surface 32 and a ray 33 reflected by a micromirror 34 in a Micromirror Array Lens. The optical path length difference is caused by height difference, $\Delta z$ between the single bodied reflective surface 32 and the micromirror 34. In case of monochromatic light, even though the OPL of converging light rays is different, the phases of two light rays 31 and 33 can be matched by adjusting the OPD to be m times of wavelength because the phase of light is periodic, where m is an integer. This phase matching condition is "Periodic Phase Matching Condition" for Micromirror Array Lens in the present invention. For light having a broadband wavelength range, the OPD can not be adjusted to m times of wavelength for all wavelengths. It causes a significant amount of chromatic aberration when the Micromirror Array Lens has a large optical power.

Figure 4:
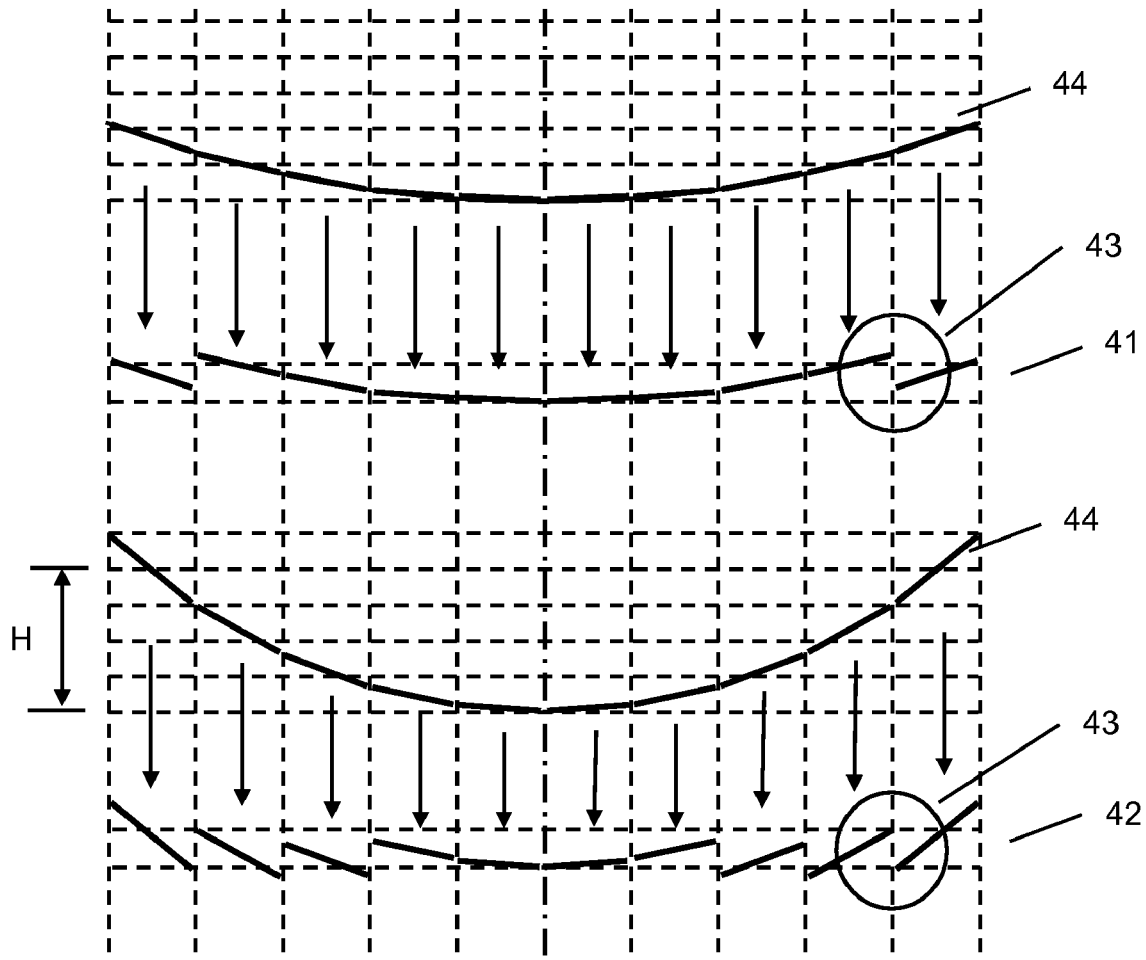
FIG. 4 shows profile discontinuity comparison between a Micromirror Array Lens with low power and a Micromirror Array Lens with high power.

FIG. 4 shows the profile discontinuity of the Micromirror Array Lens. A Micromirror Array Lens with low optical power 41 has small number of profile discontinuities 43. In contrast, a Micromirror Array Lens with high optical power 42 has large number of profile discontinuities 43. Because the chromatic aberration is mainly caused by profile discontinuity, it is necessary to minimize the number of profile discontinuity. Especially, it is necessary to reduce the number of profile discontinuity for a high optical power Micromirror Array Lens 42.

If micromirror array simulates continuous reflective lens profile 44, there is no chromatic aberration. It is almost impractical for a flat arranged Micromirror Array Lens, since the micromirrors should have huge translation amount H to simulate continuous reflective lens profile 44.

Figure 5:
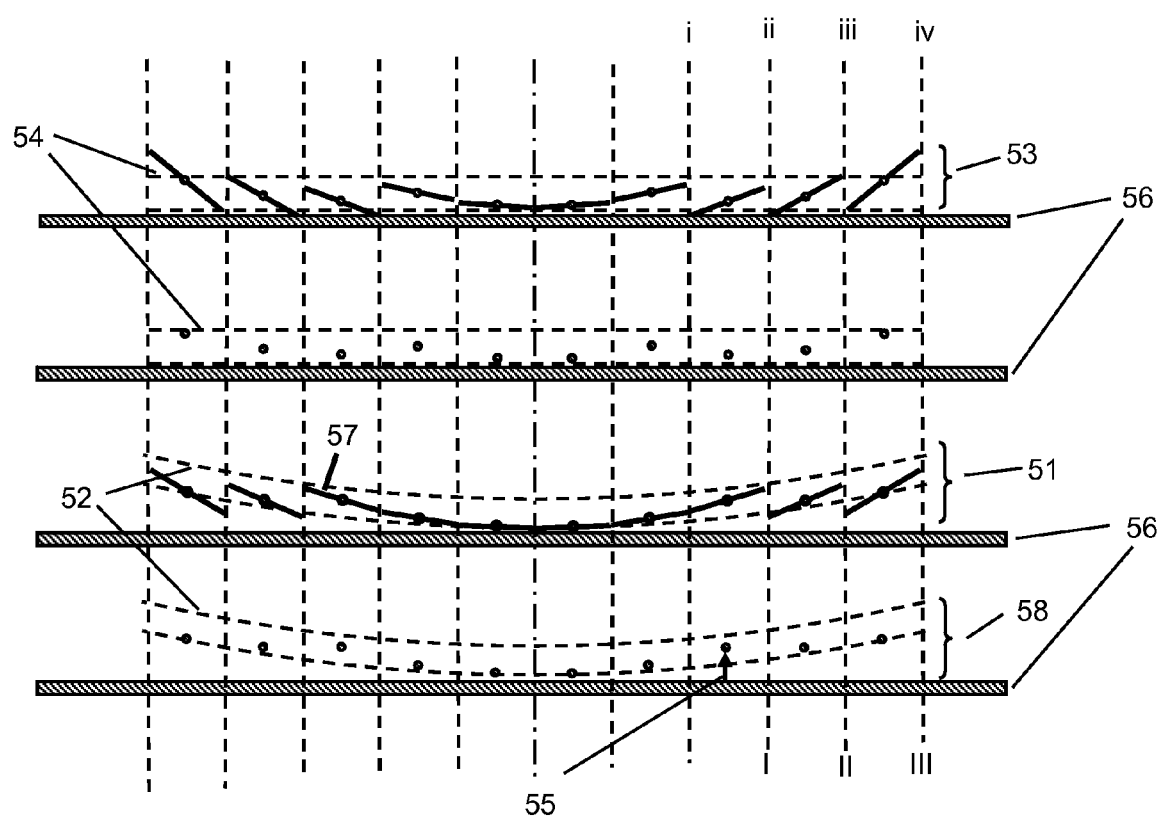
FIG. 5 profile discontinuity comparison between a Hybrid Micromirror Array Lens and a conventional Micromirror Array Lens.

The large optical power Micromirror Array Lens can be generated by using Hybrid Micromirror Array Lens 51, which uses a combination of a power of continuous reflective lens 52 and a power of conventional flat surface arranged Micromirror Array Lens as shown in FIG. 5. FIG. 5 shows the principle of Hybrid Micromirror Array Lens 51. At the conventional flat surface Micromirror Array Lens 53, base curve 54 is flat so that there is no power on base curve 54 and the required translational amount is less than a wavelength. If optical path length (OPL) difference between two converging rays reflected two neighboring micromirrors is larger than one wavelength, the profile of the Micromirror Array Lens will be discontinuous by a periodic phase matching condition. Chromatic aberration occurs at these discontinuous profiles.

To minimize the chromatic aberration due to the discontinuity of the profiles, the number of discontinuity should be minimized. If the Micromirror Array Lens is fabricated on curve surface with power 52, the number of discontinuity is decreased because the curve surface 52 shares optical power with the rotation of the micromirrors in the Micromirror Array Lens. For example in FIG. 5, conventional Micromirror Array Lens has three discontinuities, but Hybrid Micromirror Array Lens has only two discontinuities as shown in FIG. 5.

Practically, it is very difficult to make a Micromirror Array Lens on a curve substrate using the microfabrication technology. In addition, it is necessary to change the curvature of substrate if the Micromirror Array Lens is a variable focusing lens with large optical power variation. It is difficult to change the curvature of substrate. Instead of curved substrate, if the translation 55 of the micromirrors can simulate the curved base curve 52 on flat substrate 56, variable focusing lens with high power variation is possible with small chromatic aberration. Hybrid Micromirror Array Lens in the present invention is the lens with advantages of continuous curved profile and conventional Micromirror Array Lens profile.

A Hybrid Micromirror Array Lens 51 comprises a plurality of micromirrors 57, wherein an optical surface profile of Hybrid Micromirror Array Lens is controlled by rotation and translation of the micromirrors. A contour 58 of the translations 55 has an optical power. The rotation of the micromirrors is controlled to satisfy converging condition and the translation of the micromirrors is controlled in order that the translation contour has optical power and to satisfy the periodic phase matching condition.

With the help of the base curvature of the Hybrid Micromirror Array Lens made by the translation of the micromirrors, the required translational amount and the chromatic aberration to make a high optical power lens are considerably reduced.

As a conventional Micromirror Array Lens, each optical surface profile in the Hybrid Micromirror Array Lens simulates a lens with predetermined optical properties. Thanks to the periodic phase matching condition, the micromirrors in the Hybrid Micromirror Array Lens can be arranged in a flat surface. Motion of each micromirror is defined as a combination of rotation and translation. The optical surface profile is determined by rotation and translation of the micromirrors in the Hybrid Micromirror Array Lens.

The optical surface profile has a translation contour purely determined by translation of the micromirrors. To meet the periodic phase matching condition, half wavelength of the wavelength is the minimum amount of the translation. But the translation motion can be used for building a translation contour. The pure translation motion determines the translation contour and thus the optical surface profile has optical power from the translation contour as well as from the rotation motion of the micromirrors. The translation contour extends the total optical power of the Micromirror Array Lens. Total optical power of the Micromirror Array lens can be achieved by a power made by a base curve, which is simulated by a contour of micromirror translation and a power of rotational motion of the micromirrors, which is described in the conventional Micromirror Array Lens.

By proper structural arrangement for micromirrors, the Hybrid Micromirror Array Lens can have multiple optical surface profiles. And the optical surface profile is changed. This changeable optical surface profile can provide variable optical properties to the Micromirror Array Lens.

The Hybrid Micromirror Array Lens changes its focal length by changing the optical surface profiles. The Hybrid Micromirror Array Lens changes its optical axis by changing the optical surface profiles. The Hybrid Micromirror Array Lens changes its field of view by changing the optical surface profiles. The Hybrid Micromirror Array Lens changes its property for aberration correction by changing the optical surface profiles.

The FIG. 6 shows the variable focusing property of the Micromirror Array Lens. The Micromirror Array Lenses 64, 65, 66 respectively simulates the continuous reflective surfaces 61, 62, 63 with focal length of $f_1$, $f_2$, $f_3$. Each micromirror simulates the part of the corresponding part of the continuous reflective surface. The flat surface arranged Micromirror Array Lenses 64, 65, 66 can make their focuses at the point of $P_1$, $P_2$, $P_3$, which corresponds to the respective focal length of the Micromirror Array Lens. The Hybrid Micromirror Array Lens can also change its focal length by changing the optical surface profiles as the Micromirror Array Lens can do.

Figure 7A:
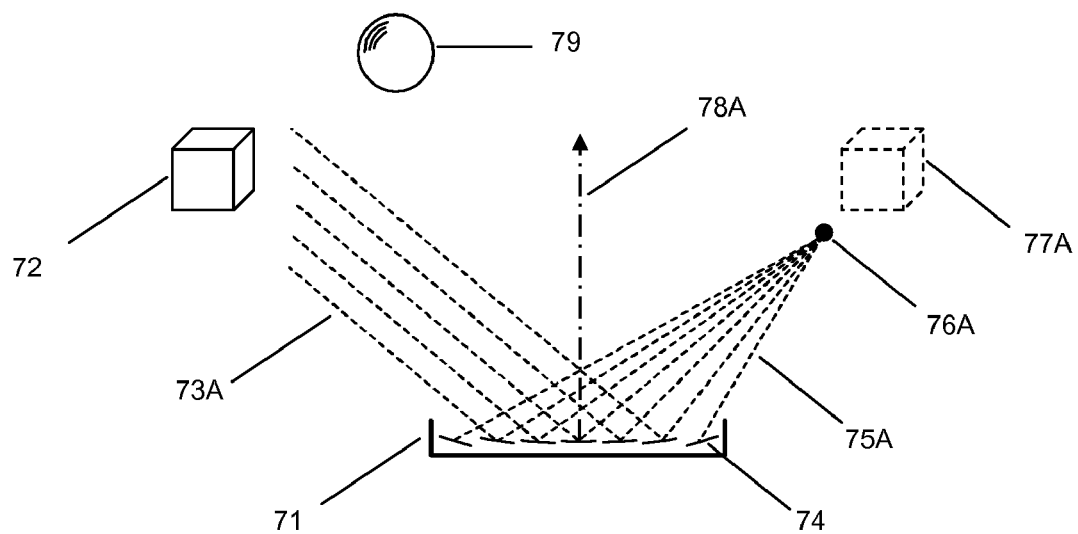

The FIG. 7 shows how the optical axis of the Hybrid Micromirror Array Lens changes. A bunch of light is focused by the Hybrid Micromirror Array Lens 71. In FIG. 7a, a cube object 72 is imaged onto the image plane. The light 73A from the object 72 is reflected by each of the micromirror 74. The reflected light 75A is focused onto the focal point 76A of the image and finally makes an image of a cube 77A in the image sensor. During the focusing process the optical axis is defined as a surface normal direction 78A of a micromirror 74.

Figure 7B:
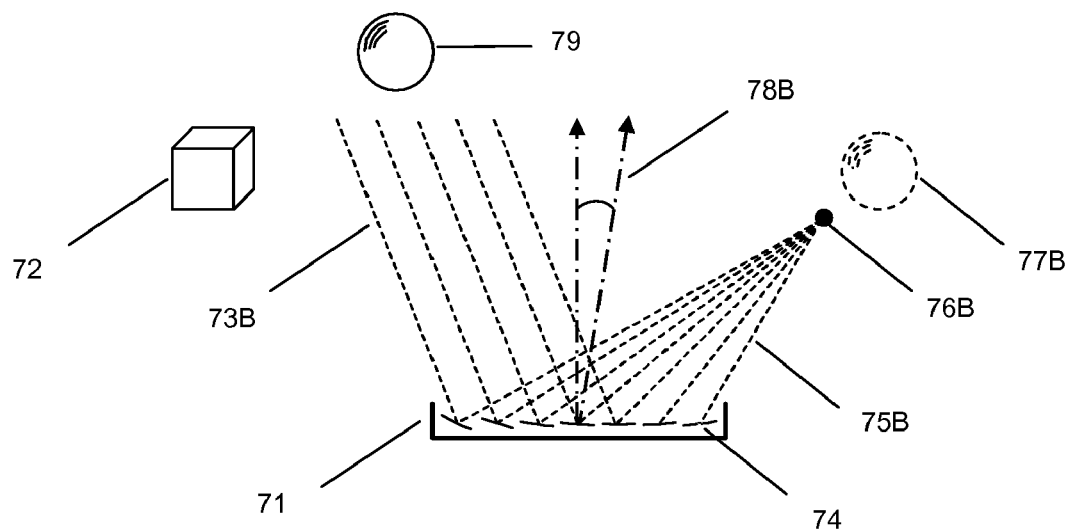

As shown in FIG. 7b, the Hybrid Micromirror Array Lens can make a different image 77B from a different object 77 without macroscopic movements. By changing the respective angles of the micromirrors 74, this time the Hybrid Micromirror Array Lens accepts the light 73B from the sphere 77. The reflected light 75B is focused onto a focal point 76B and makes the image of the sphere 77B. This time the optical axis is changed by an angle and becomes the surface normal direction 78B of a micromirror.

The Hybrid Micromirror Array Lens is an adaptive optical component because the phase of light can be changed by the translations and/or rotations of micromirrors. The Hybrid Micromirror Array Lens can correct the phase errors as an adaptive optical component can correct the phase errors of light introduced by the medium between the object and its image and/or corrects the defects of a lens system that cause its image to deviate from the rules of paraxial imagery. For an example, the Hybrid Micromirror Array Lens can correct the phase error caused by optical tilt by adjusting the translations and/or rotations of micromirrors.

The optical surface profiles satisfy the periodic phase matching condition for one wavelength. Or the optical surface profile satisfies the periodic phase matching condition for effective wavelength. The effective wavelength can be defined as a design variable for making optical system. The effective wavelength is one representative wavelength which can best describe the optical system including the periodic phase matching condition.

Each optical surface profile satisfies the periodic phase matching condition for corresponding wavelength. Each optical surface profile can have different value for periodic phase matching wavelength. The corresponding wavelength is one of Red, Green, and Blue. Also the corresponding wavelength is one of Yellow, Cyan, and Magenta.

By using the least common multiple wavelength of the light, the optical system can be optimized. The Hybrid Micromirror Array Lens can have a least common multiple of Red, Green, and Blue as the corresponding wavelength.

By using the least common multiple wavelength of the light, the optical system can be optimized. The Hybrid Micromirror Array Lens can have a least common multiple of Yellow, Cyan, and Magenta as the corresponding wavelength.

Furthermore, the optical surface profile is discretely controlled. By introducing a discretely controlled micromirrors, the Hybrid Micromirror Array lens can be easily controlled and have simpler control method. Each optical surface profile is formed by a common input signal to micromirrors in the Hybrid Micromirror Array Lens. The discretely control of the optical surface profile with the general principle, structure and methods for making the micromirror array devices and Micromirror Array Lens are disclosed in U.S. patent application Ser. No. 10/872,241 filed Jun. 18, 2004, U.S. patent application Ser. No. 11/072,597 filed Mar. 4, 2005, U.S. patent application Ser. No. 11/347,590 filed Feb. 4, 2006, U.S. patent application Ser. No. 11/369,797 filed Mar. 6, 2006, U.S. patent application Ser. No. 11/463,875 filed Aug. 10, 2006, U.S. patent application Ser. No. 11/534,613 filed Sep. 22, 2006, U.S. patent application Ser. No. 11/534,620 filed Sep. 22, 2006, U.S. patent application Ser. No. 11/549,954 filed Oct. 16, 2006, U.S. patent application Ser. No. 11/609,882 filed Dec. 12, 2006, U.S. patent application Ser. No. 11/685,119 filed Mar. 12, 2007, U.S. patent application Ser. No. 11/693,698 filed Mar. 29, 2007 and U.S. patent application Ser. No. 11/742,510 filed Apr. 30, 2007, all of which are incorporated herein by references.

Also the applications for Micromirror Array Lens and Hybrid Micromirror Array Lens are disclosed in U.S. Pat. No. 7,077,523 issued Jul. 18, 2006 to Seo, U.S. Pat. No. 7,068,416 issued Jun. 27, 2006 to Gim, U.S. patent application Ser. No. 10/914,474 filed Aug. 9, 2004, U.S. patent application Ser. No. 10/934,133 filed Sep. 3, 2004, U.S. patent application Ser. No. 10/979,619 filed Nov. 2, 2004, U.S. patent application Ser. No. 10/979,624 filed Nov. 2, 2004, U.S. patent application Ser. No. 11/076,688 filed Mar. 10, 2005, U.S. patent application Ser. No. 11/208,114 filed Aug. 19, 2005, U.S. patent application Ser. No. 11/208,115 filed Aug. 19, 2005, U.S. patent application Ser. No. 11/382,707 filed May 11, 2006, U.S. patent application Ser. No. 11/419,480 filed May 19, 2006, U.S. patent application Ser. No. 11/423,333 filed Jun. 9, 2006, all of which are incorporated herein by references.

While the invention has been shown and described with reference to different embodiments thereof, it will be appreciated by those skills in the art that variations in form, detail, compositions and operation may be made without departing from the spirit and scope of the invention as defined by the accompanying claims.

What is claimed is:

1. A Hybrid Micromirror Array Lens comprising a plurality of micromirrors, wherein rotation and translation of each micromirror in the Hybrid Micromirror Array Lens are controlled to have at least one optical surface profile, wherein the rotation of the micromirror is controlled to satisfy converging condition and the translation of the micromirror is controlled in order to have a translation contour with optical power and to satisfy periodic phase matching condition.

2. The Hybrid Micromirror Array Lens of claim 1, wherein each optical surface profile simulates a lens with predetermined optical properties.

3. The Hybrid Micromirror Array Lens of claim 2, wherein the optical surface profile is determined by rotation and translation of the micromirrors in the Hybrid Micromirror Array Lens.

4. The Hybrid Micromirror Array Lens of claim 3, the optical surface profile has a translation contour purely determined by translation of the micromirrors.

5. The Hybrid Micromirror Array Lens of claim 2, wherein the optical property is a focal length of the Hybrid Micromirror Array Lens.

6. The Hybrid Micromirror Array Lens of claim 2, wherein the optical property is an optical axis of the Hybrid Micromirror Array Lens.

7. The Hybrid Micromirror Array Lens of claim 2, wherein the optical property is a field of view of the Hybrid Micromirror Array Lens.

8. The Hybrid Micromirror Array Lens of claim 2, wherein the optical property is an aberration correction of the Hybrid Micromirror Array Lens.

9. The Hybrid Micromirror Array Lens of claim 2, wherein the optical property is an optical power of the Hybrid Micromirror Array Lens.

10. The Hybrid Micromirror Array Lens of claim 2, wherein the optical property is an optical magnification of the Hybrid Micromirror Array Lens.

11. The Hybrid Micromirror Array Lens of claim 1, wherein the optical surface profile satisfies the periodic phase matching condition for one wavelength.

12. The Hybrid Micromirror Array Lens of claim 1, wherein the optical surface profile satisfies the periodic phase matching condition for effective wavelength.

13. The Hybrid Micromirror Array Lens of claim 1, wherein the Hybrid Micromirror Array Lens has multiple optical surface profiles.

14. The Hybrid Micromirror Array Lens of claim 13, wherein the optical surface profile is changed.

15. The Hybrid Micromirror Array Lens of claim 14, wherein the Hybrid Micromirror Array Lens changes its focal length by changing the optical surface profiles.

16. The Hybrid Micromirror Array Lens of claim 14, wherein the Hybrid Micromirror Array Lens changes its optical axis by changing the optical surface profiles.

17. The Hybrid Micromirror Array Lens of claim 14, wherein the Hybrid Micromirror Array Lens changes its field of view by changing the optical surface profiles.

18. The Hybrid Micromirror Array Lens of claim 14, wherein the Hybrid Micromirror Array Lens changes its property for aberration correction by changing the optical surface profiles.

19. The Hybrid Micromirror Array Lens of claim 14, wherein the Hybrid Micromirror Array Lens changes its optical power by changing the optical surface profiles.

20. The Hybrid Micromirror Array Lens of claim 14, wherein the optical power is changed by change of the translational contour.

21. The Hybrid Micromirror Array Lens of claim 14, wherein the Hybrid Micromirror Array Lens changes its optical magnification by changing the optical surface profiles.

22. The Hybrid Micromirror Array Lens of claim 13, wherein the optical surface profiles satisfy the periodic phase matching condition for one wavelength.

23. The Hybrid Micromirror Array Lens of claim 13, wherein the optical surface profile satisfy the periodic phase matching condition for effective wavelength.

24. The Hybrid Micromirror Array Lens of claim 13, wherein each optical surface profile satisfies the periodic phase matching condition for corresponding wavelength.

25. The Hybrid Micromirror Array Lens of claim 24, wherein the corresponding wavelength is one of Red, Green, and Blue.

26. The Hybrid Micromirror Array Lens of claim 24, wherein the corresponding wavelength is one of Yellow, Cyan, and Magenta.

27. The Hybrid Micromirror Array Lens of claim 24, wherein the corresponding wavelength is least common multiple of Red, Green, and Blue.

28. The Hybrid Micromirror Array Lens of claim 24, wherein the corresponding wavelength is least common multiple of Yellow, Cyan, and Magenta.

29. The Hybrid Micromirror Array Lens of claim 13, wherein the optical surface profile is discretely controlled.

30. The Hybrid Micromirror Array Lens of claim 13, wherein each optical surface profile is formed by a common input signal to micromirrors in the Hybrid Micromirror Array Lens.

* * * * *